US011097879B1

(12) United States Patent
Chen et al.

(10) Patent No.: US 11,097,879 B1
(45) Date of Patent: Aug. 24, 2021

(54) CABLE TIE

(71) Applicant: Aten International Co., Ltd., New Taipei (TW)

(72) Inventors: Chih-Ming Chen, New Taipei (TW); You-Lin Shih, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 17/035,718

(22) Filed: Sep. 29, 2020

(30) Foreign Application Priority Data

May 11, 2020 (TW) ................................. 109115516

(51) Int. Cl.
*B65D 63/10* (2006.01)

(52) U.S. Cl.
CPC ................................. *B65D 63/1072* (2013.01)

(58) Field of Classification Search
CPC .................................................. B65D 63/1072
See application file for complete search history.

(56) References Cited

U.S. PATENT DOCUMENTS

| | | | | | |
|---|---|---|---|---|---|
| 3,855,669 | A | * | 12/1974 | Meyer | B60R 16/0215 24/16 PB |
| 3,991,444 | A | * | 11/1976 | Bailey | B65D 63/1063 24/16 PB |
| 4,236,280 | A | * | 12/1980 | Kreiseder | B65D 63/1072 24/16 PB |
| 5,293,669 | A | * | 3/1994 | Sampson | A43C 11/14 24/16 PB |
| 6,185,791 | B1 | * | 2/2001 | Khokhar | B65D 63/1063 24/16 PB |
| 8,516,660 | B2 | * | 8/2013 | Ku | B65D 63/1072 24/16 PB |
| 2003/0229972 | A1 | * | 12/2003 | Welch | B65D 63/1063 24/16 PB |
| 2011/0042122 | A1 | | 2/2011 | Hsieh et al. | |
| 2011/0271492 | A1 | * | 11/2011 | Posner | F16L 33/035 24/16 R |
| 2012/0017401 | A1 | * | 1/2012 | Cheng | B65D 63/1072 24/16 R |
| 2012/0054988 | A1 | * | 3/2012 | Cheng | B65D 63/00 24/16 R |

FOREIGN PATENT DOCUMENTS

| | | |
|---|---|---|
| CN | 102464143 | 1/2015 |
| TW | M430455 | 6/2012 |
| TW | M489829 | 11/2014 |
| TW | M533037 | 12/2016 |

* cited by examiner

*Primary Examiner* — David M Upchurch
(74) *Attorney, Agent, or Firm* — JCIPRNET

(57) ABSTRACT

A cable tie including a belt, a base, a restricting part, and a controlling part is provided. The belt has a contacting side. The base is connected to a first end of the belt and has a through-hole. The restricting part is connected to the base and is located in the through-hole. The controlling part has a connecting portion, and a protruding portion and a pressing portion away from the connecting portion, and the connecting portion is connected to the base. When the belt passes through the through-hole, the contacting side defines a tying area for accommodating a tied object, and the protruding portion protrudes into the tying area. When the tied object pushes the protruding portion towards outside the tying area, the pressing portion presses the restricting part to restrict a movement of the belt.

9 Claims, 5 Drawing Sheets

CABLE TIE

CROSS-REFERENCE TO RELATED APPLICATION

This application claims the priority benefit of Taiwan application serial no. 109115516, filed on May 11, 2020. The entirety of the above-mentioned patent application is hereby incorporated by reference herein and made a part of this specification.

BACKGROUND

Technical Field

The disclosure relates to a tool, and more particularly relates to a cable tie.

Description of Related Art

Currently, the operations of fastening cables with cable ties are mostly performed manually. The strength and standard of each worker are different, which results in different degrees of binding tightness with the cable ties. An over-tightening cable tie causes stress to the external insulating materials of the cables, which thus reduces the thickness of the external insulating materials of the cables. In the case where the bound objects are power cables or the like, when a higher electric current travels through, the power cables or the like generate heat, which heats the external insulating materials of the cables. At this time, the protection effect provided by the external insulating materials which are thinned due to over-tightening is lowered.

SUMMARY

The disclosure provides a cable tie which can prevent possible problems arising from over-tightening.

The cable tie according to an embodiment of the disclosure includes a belt, a base, a restricting part, and a controlling part. The belt has a contacting side. The base is connected to a first end of the belt and has a through-hole. The restricting part is connected to the base and is located in the through-hole. The controlling part has a connecting portion, and a protruding portion and a pressing portion away from the connecting portion. The connecting portion is connected to the base. When the belt passes through the through-hole, the contacting side defines a tying area for accommodating a tied object, and the protruding portion protrudes into the tying area. When the tied object pushes the protruding portion towards outside the tying area, the pressing portion presses the restricting part to restrict a movement of the belt.

In an embodiment of the disclosure, the cable tie is integrally formed.

In an embodiment of the disclosure, when the protruding portion is not pushed by the tied object, the pressing portion is kept at a distance from the restricting part.

In an embodiment of the disclosure, the belt further has a plurality of first unidirectional serrations located on the contacting side, and the restricting part has at least one second unidirectional serration. The second unidirectional serration works with the first unidirectional serrations to restrict the belt from moving in a direction which would result in an increase in the tying area.

In an embodiment of the disclosure, the restricting part has a plurality of second unidirectional serrations.

The cable tie according to an embodiment of the disclosure includes a belt, a base, a restricting part, and a controlling part. The belt has a contacting side. The base is connected to a first end of the belt and has a through-hole. The restricting part is connected to the base and is located in the through-hole. The controlling part has a connecting portion, and a protruding portion and a pressing portion away from the connecting portion. The connecting portion is connected to the base. The pressing portion is kept at a distance from the restricting part, and the controlling part is rotatable to press the restricting part by the pressing portion. When the belt passes through the through-hole, the contacting side defines a tying area for accommodating a tied object, and the protruding portion protrudes into the tying area.

In an embodiment of the disclosure, the cable tie is integrally formed.

In an embodiment of the disclosure, the belt further has a plurality of first unidirectional serrations located on the contacting side, and the restricting part has at least one second unidirectional serration. The second unidirectional serration works with the first unidirectional serrations to restrict the belt from moving in a direction which would result in an increase in the tying area.

In an embodiment of the disclosure, the restricting part has a plurality of second unidirectional serrations.

Based on the foregoing, in the cable tie of the disclosure, when the protruding portion is pushed by the tied object, the pressing portion presses the restricting part to restrict the movement of the belt. Therefore, the cable tie can be prevented from over-tightening, thus ensuring that the tied object is not damaged.

DESCRIPTION OF THE EMBODIMENTS

Figure 1:
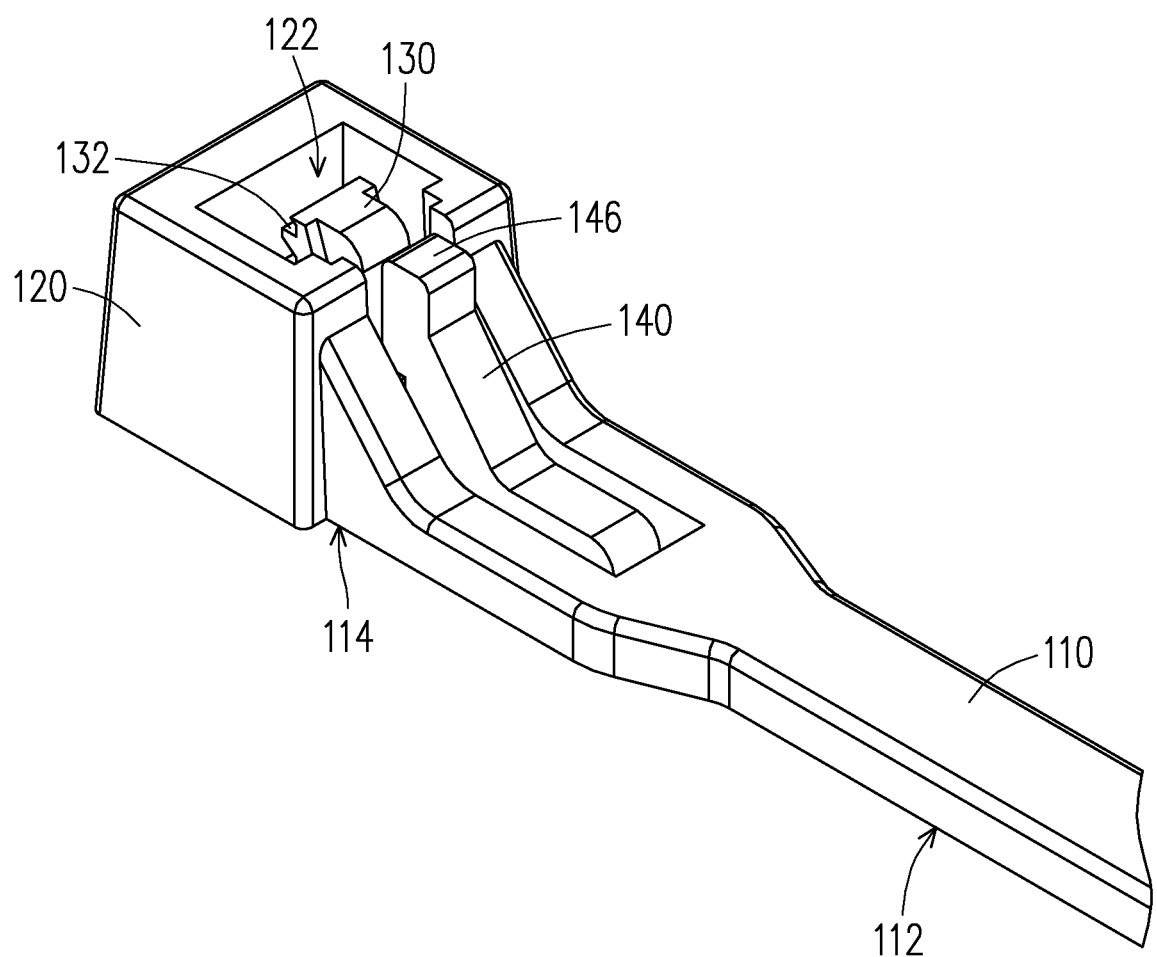
FIG. 1 is a perspective view showing a cable tie according to an embodiment of the disclosure.
Figure 2:
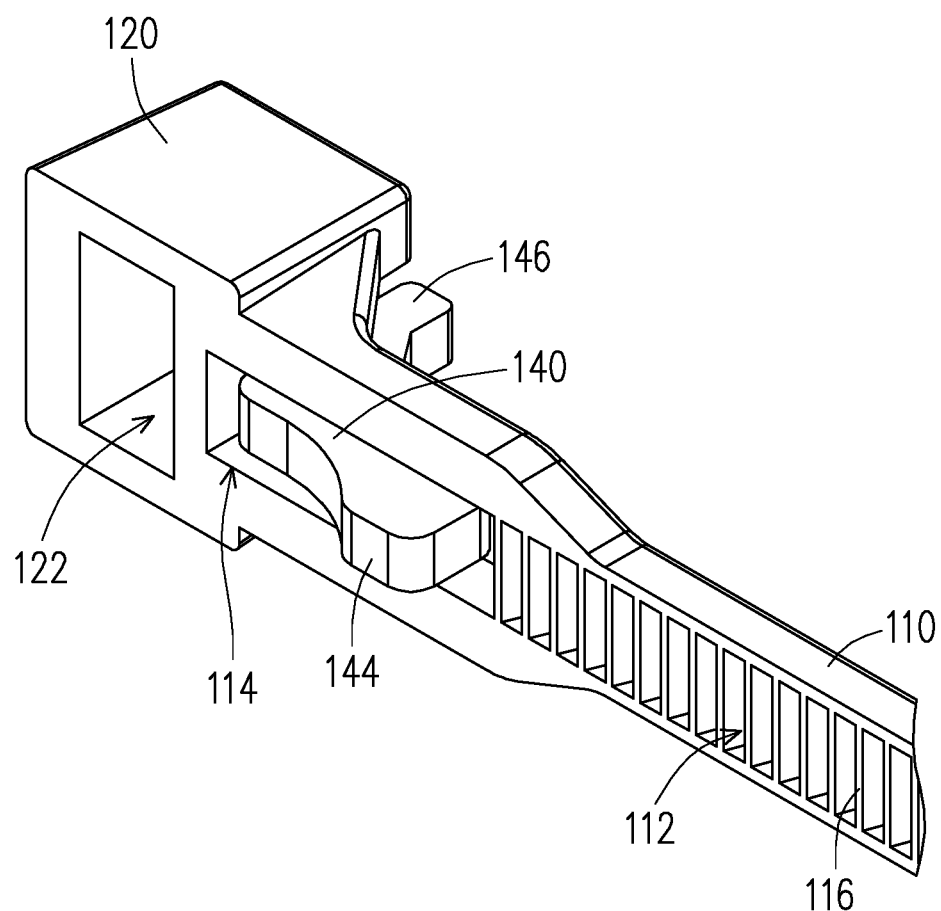
FIG. 2 is a perspective view showing the cable tie of FIG. 1 from another viewing angle.

FIG. 1 is a perspective view showing a cable tie according to an embodiment of the disclosure. FIG. 2 is a perspective view showing the cable tie of FIG. 1 from another viewing angle. Referring to FIG. 1 and FIG. 2, the cable tie 100 of this embodiment includes a belt 110, a base 120, a restricting part 130, and a controlling part 140. The belt 110 has a contacting side 112. The base 120 is connected to a first end 114 of the belt 110, and the base 120 has a through-hole 122. The restricting part 130 is connected to the base 120 and is located in the through-hole 122.

Figure 3:
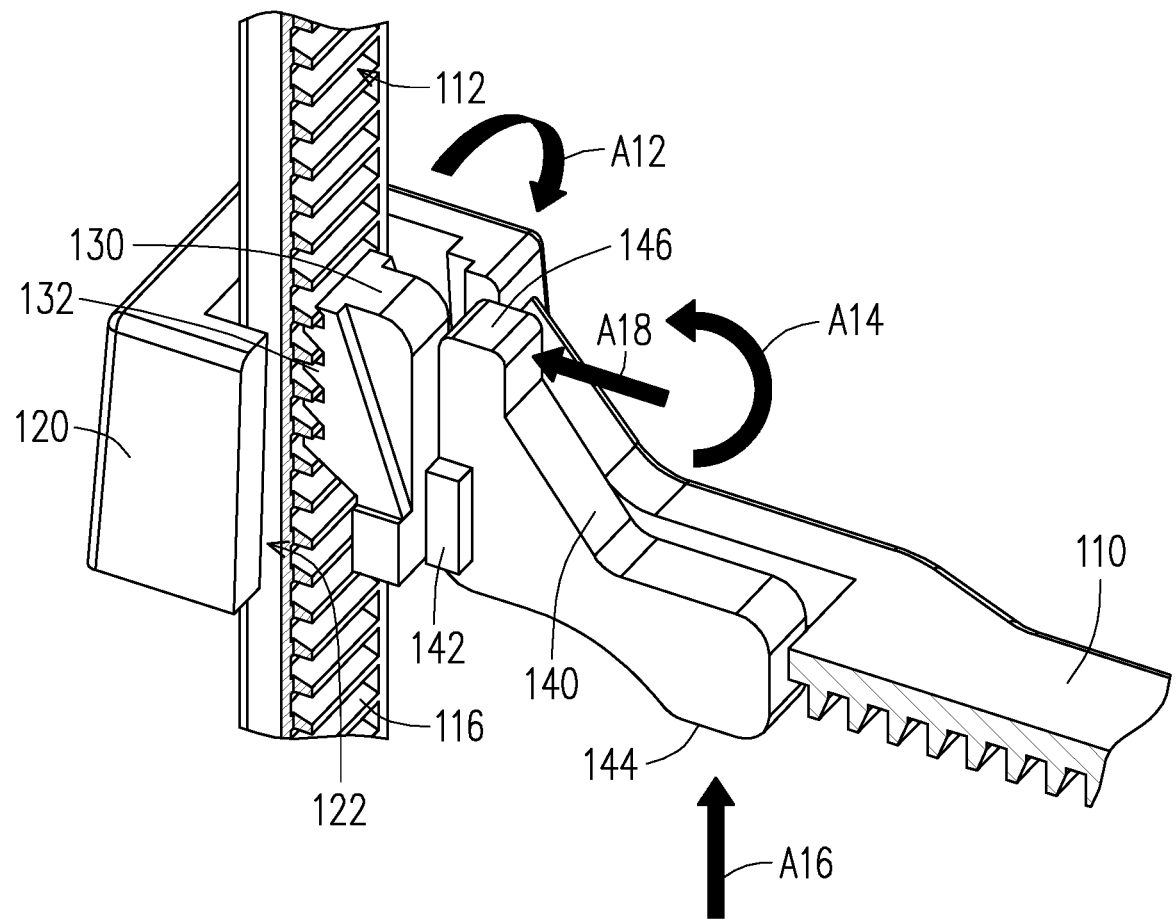
FIG. 3 is a partial sectional view showing the cable tie of FIG. 1 in a tying state.
Figure 4:
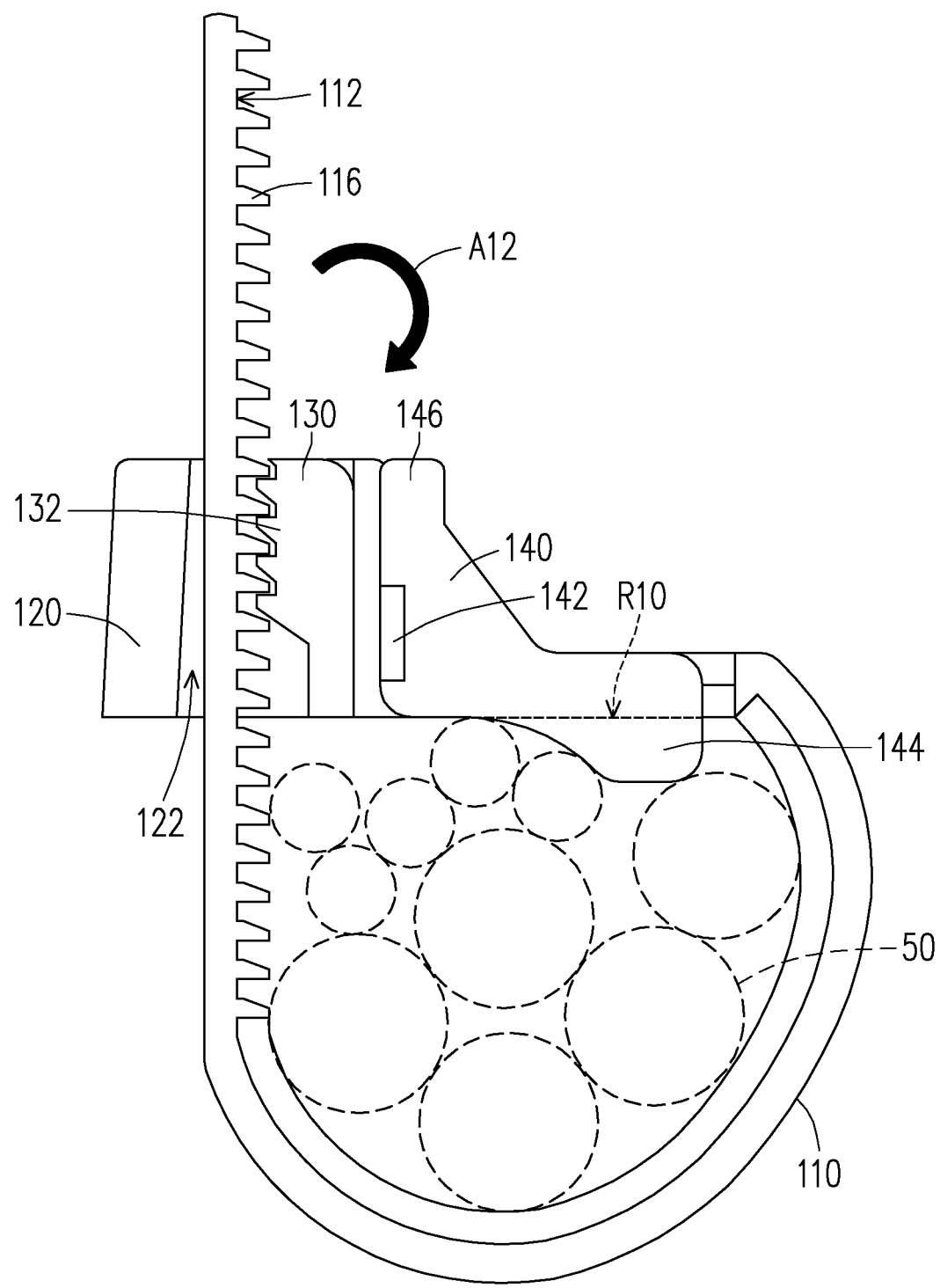
FIG. 4 and FIG. 5 are sectional views showing the controlling part of the cable tie of FIG. 1 before and after actuation respectively.
Figure 5:
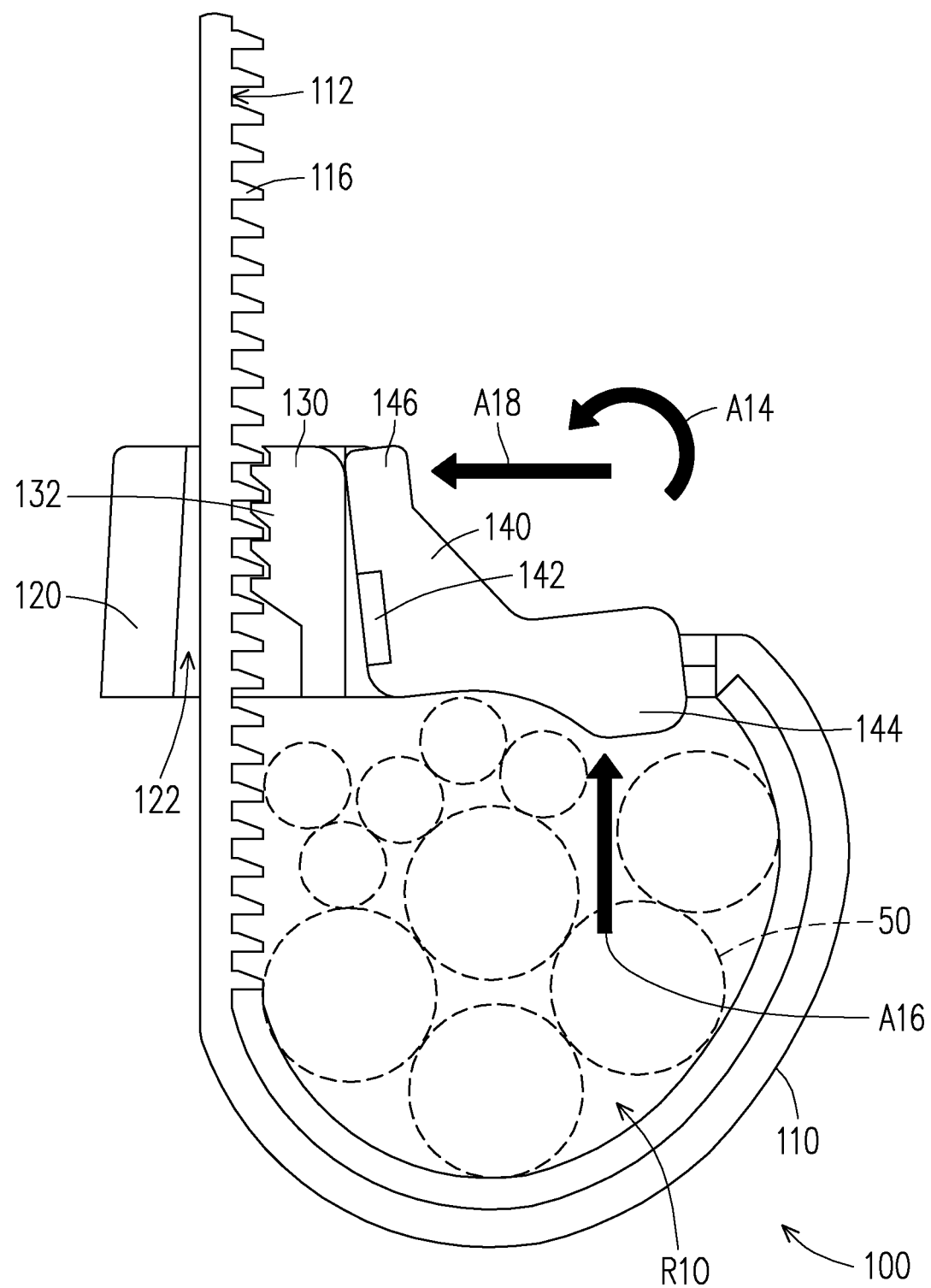

FIG. 3 is a partial sectional view showing the cable tie of FIG. 1 in a tying state. FIG. 4 and FIG. 5 are sectional views showing the controlling part of the cable tie of FIG. 1 before and after actuation respectively. Referring to FIG. 3 and FIG. 4, the controlling part 140 has a connecting portion 142, and a protruding portion 144 and a pressing portion 146 which are away from the connecting portion 142. The connecting portion 142 is connected to the base 120. When the belt 110 passes through the through-hole 122, the contacting side 112 defines a tying area R10 for accommodating a tied object 50. In other words, when the cable tie 100 is in a tying state, the belt 110 is surrounding the tied object 50, and the area enclosed by the belt 110 is the tying area R10. The contacting side 112 is a side of the belt 110 for contacting the tied object 50.

As can be seen in FIG. 4, in the absence of an external force acting thereon, the protruding portion 144 protrudes into the tying area R10, and at this time, the pressing portion 146 is kept at a distance from the restricting part 130. In this state, when the belt 110 moving in the through-hole 122, it may drive the restricting part 130 to repetitively rotate along a direction A12 and a reverse direction thereof, and the rotation of the restricting part 130 is not restricted.

Next, referring to FIG. 5, during the process of tightening, when the tied object 50 pushes the protruding portion 144 towards outside the tying area R10 along a direction A16, the controlling part 140 rotates along a direction A14, and the pressing portion 146 moves along a direction A18. When the pressing portion 146 moves along the direction A18, the distance between the pressing portion 146 and the restricting part 130 will be changed. In addition, the pressing portion 146 will press the restricting part 130 and cause the restricting part 130 to contact the belt 110 to an extent that the restricting part 130 is unable to rotate. Thereby, the restricting part 130 restricts the movement of the belt 110.

It is known from the foregoing that when the tied object 50 pushes the protruding portion 144 towards outside the tying area R10, it means further decrease in the tying area R10 will cause a problem of over-tightening. However, since the pressing portion 146 of the controlling part 140 presses the restricting part 130 to restrict the movement of the belt 110, the tying area R10 is prevented from further decrease, and the problem of over-tightening is therefore not caused.

In this embodiment, the cable tie 100 is integrally formed. For instance, the cable tie 100 may be formed via an injection molding with a plastic material, to reduce the time and cost needed for assembling in a manner other than the integral molding. Nevertheless, the disclosure is not limited to the case where the cable tie 100 must be integrally formed.

In this embodiment, when the protruding portion 144 is not pushed by the tied object 50, the pressing portion 146 is kept at a distance from the restricting part 130. However, in other embodiments, when the protruding portion 144 is not pushed by the tied object 50, the pressing portion 146 may be in exact contact with, but does not push, the restricting part 130. By devising the distance between the pressing portion 146 and the restricting part 130, the extent of tightness for restricting the belt 110 from moving can adjusted.

In this embodiment, the belt 110 further has a plurality of first unidirectional serrations 116 located on the contacting side 112, and the restricting part 130 has at least one second unidirectional serration 132. When the belt 110 moves in the through-hole 122 and causes decrease in the tying area R10, the first unidirectional serrations 116 flip the second unidirectional serration 132 and thus cause the restricting part 130 to rotate. The second unidirectional serration 132 may work with the first unidirectional serrations 116 and restrict the belt 110 from moving in a direction which would result in an increase in the tying area R10. In other words, when the belt 110 is about to move in the reverse direction in the through-hole 122 to enlarge the tying area R10, the first unidirectional serrations 116 and the second unidirectional serration 132 work with each other to prevent the belt 110 from moving, and the objective of preventing the cable tie 100 from loosening is accordingly achieved. Herein, the quantity of the second unidirectional serration 132 may be plural, but in other embodiments, the quantity of the second unidirectional serration 132 may be singular.

In summary of the foregoing, in the cable tie of the disclosure, when over-tightening is about to occur, the protruding portion will be pushed by the tied object, so that the pressing portion presses the restricting part to restrict the movement of the belt. Hence, without the need of human judgment, the cable tie of the disclosure automatically restricts the movement of the belt to prevent the cable tie from over-tightening, and has a function of protecting the tied object from damage.

What is claimed is:

1. A cable tie comprising:
a belt having a contacting side;
a base connected to a first end of the belt and having a through-hole;
a restricting part connected to the base and located in the through-hole; and
a controlling part having a connecting portion, and a protruding portion and a pressing portion away from the connecting portion, wherein the connecting portion is connected to the base,
wherein when the belt passes through the through-hole, the contacting side defines a tying area for accommodating a tied object, and the protruding portion protrudes into the tying area, and
when the tied object pushes the protruding portion towards outside the tying area, the pressing portion presses the restricting part to restrict a movement of the belt.

2. The cable tie according to claim 1, wherein the cable tie is integrally formed.

3. The cable tie according to claim 1, wherein when the protruding portion is not pushed by the tied object, the pressing portion is kept at a distance from the restricting part.

4. The cable tie according to claim 1, wherein the belt further has a plurality of first unidirectional serrations located on the contacting side, the restricting part has at least one second unidirectional serration, and the second unidirectional serration works with the plurality of first unidirectional serrations to restrict the belt from moving in a direction which would result in an increase in the tying area.

5. The cable tie according to claim 4, wherein the restricting part has a plurality of the second unidirectional serrations.

6. A cable tie comprising:
a belt having a contacting side;
a base connected to a first end of the belt and having a through-hole;
a restricting part connected to the base and located in the through-hole; and
a controlling part having a connecting portion, and a protruding portion and a pressing portion away from the connecting portion, wherein the connecting portion is connected to the base, the pressing portion is kept at a distance from the restricting part, and the controlling part is rotatable to press the restricting part by the pressing portion,
wherein when the belt passes through the through-hole, the contacting side defines a tying area for accommodating a tied object, and the protruding portion protrudes into the tying area.

7. The cable tie according to claim 6, wherein the cable tie is integrally formed.

8. The cable tie according to claim 6, wherein the belt further has a plurality of first unidirectional serrations located on the contacting side, the restricting part has at least one second unidirectional serration, and the second unidirectional serration works with the plurality of first unidirectional serrations to restrict the belt from moving in a direction which would result in an increase in the tying area.

9. The cable tie according to claim 8, wherein the restricting part has a plurality of the second unidirectional serrations.

* * * * *